United States Patent [19]

Dent

[11] Patent Number: 5,305,349
[45] Date of Patent: Apr. 19, 1994

[54] QUANTIZED COHERENT RAKE RECEIVER

[75] Inventor: Paul W. Dent, Stehags, Sweden

[73] Assignee: Ericsson GE Mobile Communications Inc., Research Triangle Park, N.C.

[21] Appl. No.: 54,028

[22] Filed: Apr. 29, 1993

[51] Int. Cl.⁵ .......................................... H04L 27/30
[52] U.S. Cl. ........................................................ 375/1
[58] Field of Search ............... 375/1, 88, 91, 96, 100, 375/101; 370/18, 19, 21, 22, 20; 455/52.1, 65

[56] References Cited

U.S. PATENT DOCUMENTS

| | | | |
|---|---|---|---|
| 5,151,919 | 9/1992 | Dent | 375/1 |
| 5,164,958 | 12/1992 | Omura | 375/1 |
| 5,218,619 | 6/1993 | Dent | 375/1 |
| 5,224,122 | 6/1993 | Bruckert | 375/1 |
| 5,233,626 | 8/1993 | Ames | 375/1 |
| 5,235,615 | 8/1993 | Omura | 375/1 |
| 5,237,586 | 8/1993 | Bottomley | 375/1 |
| 5,237,587 | 8/1993 | Schoolcraft | 375/1 |

OTHER PUBLICATIONS

G. Forney, Jr., "The Viterbi Algorithm", *Proceedings of the IEEE*, vol. 61, pp. 268–278 (Mar. 1973).
K. Hole, "An Algorithm for Determining If a Rate (n-1)/n Punctured Convolutional Encoder is Catastrophic", *IEEE Trans. on Communications*, vol. 39, pp. 386–389 (Mar. 1991).
P. Monsen, "Fading Channel Communications", *IEEE Communications Magazine*, pp. 16–25 (Jan. 1980).
I. Onyszchuk, "Truncation Length for Viterbi Decoding", *IEEE Trans. on Communications*, vol. 39, pp. 1023–1026 (Jul. 1991).
R. Price et al., "A Communication Technique for Multipath Channels", *Proceedings of the IRE*, pp. 555–570 (Mar. 1958).
J. Proakis, *Digital Communications*, 2d. Ed., pp. 728–739, McGraw-Hill, Inc. (1989).
Scholtz, "Origins of Spread Spectrum Communications", *IEEE Trans. on Communications*, vol. COM-30, pp. 18–21 (May 1982).
F. Stremler, *Introduction to Communication Systems*, 2d. Ed., pp. 406–418, Addison-Wesley, Massachusetts (1982).
G. Turin, "Introduction to Spread-Spectrum Antimultipath Techniques and Their Application to Urban Digital Radio", *Proceedings of the IEEE*, vol. 68, pp. 328–353 (Mar. 1980).
N. Tzannes, *Communication and Radar Systems*, Prentice-Hall, Inc., pp. 227–239, New Jersey (1985).
H. vanLandingham, *Introduction to Digital Control Systems*, ch. 8, Observability and State Estimator Design, Macmillan Publishing co., New York (1985) pp. 307–346.
K. Wen et al., "A New Transform Algorithm for Viterbi Decoding", *IEEE Trans. on Communications*, vol. 38, pp. 764–772 (Jun. 1990).

*Primary Examiner*—Salvatore Cangialosi
*Attorney, Agent, or Firm*—Burns, Doane, Swecker & Mathis

[57] ABSTRACT

An implementation of coherent diversity combining in a RAKE receiver that uses energy in signal echoes by integrating information from main-path and bit-period-delayed signal propagation paths to remove echo distortion, or time dispersion, is described. If delayed by one chip in a CDMA system, such echoes appear as uncorrelated interference. The RAKE receiver correlates a despreading code with the current (main-path) signal samples and with the signal samples delayed by 1, 2, 4, ... bit periods, and combines the correlation results to determine the information content of the signal. After appropriate conditioning, the received signal is digitized and the signal samples are stored. Groups of samples are Fast Walsh Transformed, and the real and imaginary transforms are scaled according to a table of coefficients; the scaled results are stored. Weighted, scaled transforms of groups shifted by 1, 2, 4, ... samples are accumulated, and the index of the largest-magnitude accumulation is used to select real and imaginary transform values. The selected values are transferred to a RAKE coefficient computer and quantizer that determines from the sequence of values presented the mean value and trend of the real and imaginary components. A Kalman filter may use these values to estimate the values that will occur during the next group analysis period.

41 Claims, 11 Drawing Sheets

(a) PRODUCT OF SIGNAL 1 AND CODE 1.

(b) PRODUCT OF SIGNAL 2 AND CODE 2.

(c) SUM OF CODED SIGNALS 1 AND 2.

(d) CODE FOR SIGNAL 1.

(e) PRODUCT OF SUM WITH SIGNAL 1'S CODE.

(f) AVERAGE = 1  DECISION = +   AVERAGE = 0  DECISION = ?   AVERAGE = 0.75  DECISION = +   AVERAGE = 1.25  DECISION = +

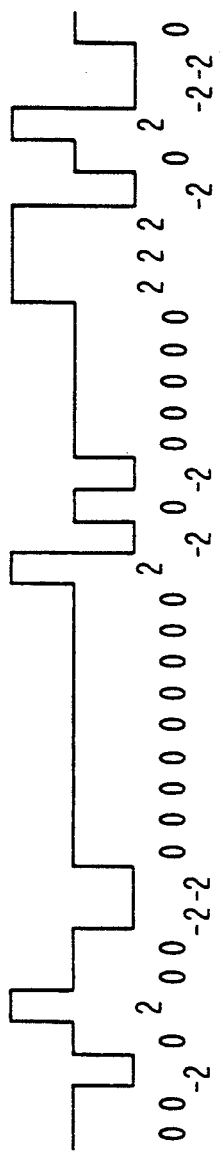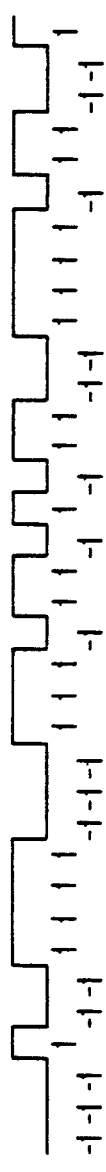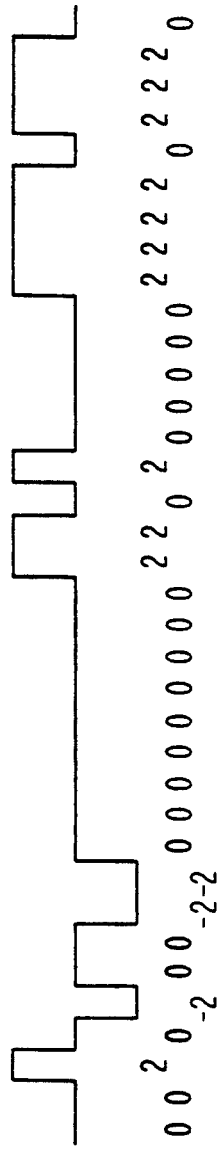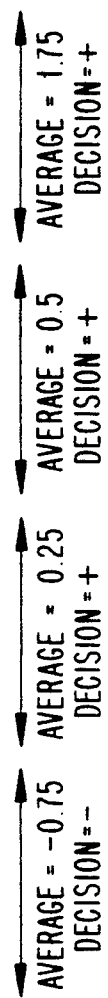
(a) SUM OF CODED SIGNALS 1 AND 2.
(b) CODE FOR SIGNAL 2.
(c) PRODUCT OF SUM WITH SIGNAL 2'S CODE.
(d)
FIG. 10

FIG. 11

(a) RECONSTRUCTED DATASTREAM FOR SIGNAL 2.

(b) CODE FOR SIGNAL 2.

(c) RECONSTRUCTED CODED SIGNAL 2.

(d) RECEIVED COMPOSITE SIGNAL.

(e) RESIDUAL OF SUM SIGNAL MINUS RECONSTRUCTED CODED SIGNAL 2.

(f) PRODUCT OF SUBTRACTIVE RESIDUAL AND SIGNAL 1'S CODE.

DECISION = +   DECISION = −   DECISION = +   DECISION = +

QUANTIZED COHERENT RAKE RECEIVER

BACKGROUND

Applicant's invention relates to methods and apparatuses for receiving spread spectrum radio signals, such as digitally modulated signals in a Code Division Multiple Access (CDMA) mobile radio telephone system, and more particularly to a RAKE receiver scheme for such signals.

In CDMA communication systems, transmitted information signals overlap in both time and frequency as described in, e.g., N. Tzannes, *Communication and Radar Systems*, pp. 237–239, Prentice-Hall, Inc. (1985). An informational data stream to be transmitted is impressed upon a much-higher-rate data stream known as a "signature sequence". Typically, the signature sequence data are binary, providing a bit stream. One way to generate this signature sequence is with a pseudonoise (PN) process that appears random, but can be replicated by an authorized receiver. The informational data stream and the high-bit-rate signature sequence stream are combined by multiplying the two bit streams together, assuming the binary values of the two bit streams are represented by $+1$ or $-1$. This combination of the higher-bit-rate signal with the lower-bit-rate data stream is called "coding" or "spreading" the informational data stream. Each informational data stream, or channel, is allocated a unique signature sequence, or "spreading code".

A plurality of coded information signals modulate a radio-frequency (RF) carrier by, for example, quadrature phase shift keying (QPSK), and are jointly received as a composite signal at a receiver. Each of the coded signals overlaps all of the other coded signals, as well as noise-related signals, in both frequency and time. If the receiver is authorized, the composite signal is correlated with one of the unique spreading codes, and the corresponding information signal can be isolated and decoded.

One CDMA technique, called "traditional CDMA with direct spreading", uses a spreading code to represent one bit of information. Receiving the transmitted code or its complement (the opposite of each bit of the code sequence) indicates whether the information bit is a "$-1$" or "$+1$". The signature sequence usually comprises N bits, and each bit is called a "chip". The entire N-chip sequence, or its complement, is referred to as a transmitted symbol. The receiver correlates the received signal with the known signature sequence of its own signature sequence generator to produce a normalized value ranging from $-1$ to $+1$. When a large positive correlation results, a "$-1$" is detected; when a large negative correlation results, a "$+1$" is detected. Various aspects of PN codeword detection with correlators are described in F. Stremler, *Introduction to Communication Systems*, 2d ed., pp. 412–418, Addison-Wesley Publishing Co. (1982).

Another CDMA technique, called "enhanced CDMA with direct spreading" allows each transmitted sequence to represent more than one bit of information. A set of codewords, typically orthogonal codewords or bi-orthogonal codewords, is used to encode a group of information bits into a much longer code sequence or code symbol. A signature sequence, or "scramble mask", is modulo-2 added to the binary code sequence before transmission. At the receiver, the known scramble mask is used to descramble the received signal, which is then correlated against all possible codewords. The codeword having the largest correlation value indicates which codeword was most likely sent, indicating which information bits were most likely sent. One common orthogonal code is the Walsh-Hadamard (WH) code.

In both traditional and enhanced CDMA, the "information bits" referred to above can also be coded bits, where the code used is a block or convolutional code. One or more information bits can form a data symbol. Also, the signature sequence, or scramble mask, can be much longer than a single code sequence, in which case a subsequence of the signature sequence is added to the code sequence.

There are a number of advantages associated with CDMA communication techniques. The capacity limits of CDMA-based cellular telephone systems are projected to be up to twenty times that of existing analog technology due to wideband CDMA's improved coding gain/modulation density, voice activity gating, sectorization, and reuse of the same spectrum in every cell. CDMA transmission of voice by a high-bit-rate decoder insures superior, realistic voice quality. CDMA also provides for variable data rates allowing many different grades of voice quality to be offered. The scrambled signal format of CDMA completely eliminates crosstalk and makes it very difficult and costly to eavesdrop or track calls, insuring greater privacy for callers and greater immunity from airtime fraud. fraud.

In many radio communication systems, the received signal includes two components, an I (in-phase) component and a Q (quadrature) component. This results because the transmitted signal has two components, and/or the intervening channel or the lack of a coherent carrier reference causes the transmitted signal to be divided into I and Q components. In a typical receiver using digital signal processing, the received I and Q component signals are sampled every $T_c$ seconds, where $T_c$ is the duration of a chip, and the samples are stored for further processing.

In mobile communication systems, signals transmitted between base and mobile stations typically suffer from echo distortion or time dispersion, caused by, for example, signal reflections from large buildings or nearby mountain ranges. Multipath dispersion occurs when a signal proceeds to the receiver along not one but many paths so that the receiver hears many echoes having different and randomly varying delays and amplitudes. Thus, when multipath time dispersion is present in CDMA system, the receiver receives a composite signal of multiple versions of the transmitted symbol that have propagated along different paths (referred to as "rays"), some of which may have relative time delays of less than one symbol period.

Each distinguishable "ray" has a certain relative time of arrival k $T_c$ seconds and spans N of the I and Q chip samples, since each signal image is an N-chip sequence in a traditional CDMA system. As a result of multipath time dispersion, the correlator outputs several smaller spikes rather than one large spike. Each ray that is received after the symbol period (i.e., if the time delay caused by a reflection exceeds one symbol period) appears as an uncorrelated interfering signal that reduces the total capacity of the communication system. To detect optimally the transmitted symbols (bits), the spikes received must be combined in an appropriate way.

Typically, this can be done by a RAKE receiver, which is so named because it "rakes" all the multipath contributions together. Various aspects of RAKE receivers are described in R. Price et al., "A Communication Technique for Multipath Channels", Proc. IRE, vol. 46, pp. 555-570 (March 1958); G. Turin, "Introduction to Spread-Spectrum Antimultipath Techniques and Their Application to Urban Digital Radio", Proc. IEEE, vol. 68, pp. 328-353 (March 1980); and J. Proakis, *Digital Communications*, 2d ed., pp. 729-739, McGraw-Hill, Inc. (1989).

A RAKE receiver uses a form of diversity combining to collect the signal energy from the various received signal paths, i.e., the various signal rays. Diversity provides redundant communication channels so that when some channels fade, communication is still possible over non-fading channels. A CDMA RAKE receiver combats fading by detecting the echo signals individually using a correlation method and adding them algebraically (with the same sign). Further, to avoid intersymbol interference, appropriate time delays are inserted between the respective detected echoes so that they fall into step again.

An example of a multipath profile of a received composite signal is illustrated in FIG. 1. The ray that propagates along the shortest path arrives at a time $T_0$ with an amplitude $A_0$, and rays propagating along longer paths arrive at times $T_1$, $T_2$, $T_3$ with amplitudes $A_1$, $A_2$, $A_3$, respectively. For simplicity, the typical RAKE receiver assumes that the time delays between the rays are a constant, i.e., $T_1=T_0+dT$, $T_2=T_0+2dT$, and $T_3=T_0+3dT$ for the profile shown; the time delays (and amplitudes) are usually estimated from the received composite signal's history.

In one form of RAKE receiver, correlation values of the signature sequence with the received signals at different time delays are passed through a delay line that is tapped at the expected time delay (dt), i.e., the expected time between receiving echoes. The outputs at the RAKE taps are then combined with appropriate weights. Such a receiver searches for the earliest ray by placing a tap at $T_0$, and for a ray delayed by dt by placing a tap at $T_0+dt$, and so forth. The RAKE tap outputs having significant energy are appropriately weighted and combined to maximize the received signal-to-noise-and-interference ratio. Thus, the total time delay of the delay line determines the amount of arrival time delay that can be searched. In one useful CDMA system, up to 128 microseconds ($\mu$sec) can be searched, corresponding to thirty-two chips, and the total time delay of the taps that can be combined is thirty-two $\mu$sec, corresponding to an eight-chip window movable within the thirty-two-chip total delay.

FIGS. 2A and 2B illustrate how manipulating the RAKE taps adapts the RAKE receiver to signals that have different delays. In FIG. 2A, eight taps, which are identified by the arrival times $T_0$-$T_7$, are provided, of which only the outputs of taps $T_4$-$T_7$ are given non-zero weights $W_4$-$W_7$, respectively. In FIG. 2B, only the outputs of taps $T_0$-$T_3$ are given non-zero weights $W_0$-$W_3$, respectively. When the weights $W_0$-$W_3$ are respectively the same as the weights $W_4$-$W_7$, the receiver is adapted to the same signal, but for a time of arrival $T_0$ rather than $T_4$. In a "digital" RAKE, or DRAKE, receiver, the weights are either 0 or 1, as described in the paper by Turin cited above.

A diagram of a conventional RAKE receiver using post-correlator, coherent combining of different rays is shown in FIG. 3. A received radio signal is demodulated by, for example, mixing it with cosine and sine waveforms and filtering the signal in an RF receiver 1, yielding I and Q chip samples. These chip samples are collected in a buffer memory that is composed of two buffers 2a, 2b for the I, Q samples, respectively. As illustrated in FIG. 3, the bottom of each buffer 2a, 2b contains the most recently received chip samples.

A multiplexer 3 receives the buffered chip samples and sends complex correlators 4a, 4b a range of I chip samples and the corresponding range of Q chip samples. The range selected includes N samples corresponding to the N-chip sequence arriving at a certain time. For example, if the buffers 2a, 2b each contain 159 chip samples (numbered 0-158) and N is 128, then the multiplexer 3 would send chip samples numbered i through (i+127) from the I buffer 2a, and chip samples numbered i through (i+127) from the Q buffer 2b to the correlator 4a, where i is the discrete time index of the signal rays from when the buffers were first filled. Two different sets of chip samples, i.e., two different received sample ranges and hence a different signal ray, are provided by the multiplexer 3 to the correlator 4b. A complex correlation value is formed by each correlator 4a, 4b that correlates its two sets of signal samples I, Q to the known signature sequence, or spreading code. Of course, the multiplexer 3 can provide the received samples either serially or in parallel.

In general, a complex correlator correlates a complex input stream (I+jQ samples) to a complex known sequence, producing a complex correlation value. If the signature sequence is not complex, each complex correlator can be implemented as two scalar correlators in parallel, which may be defined as a "half-complex" correlator. If the signature sequence is complex, the complex correlators correlate a complex input to a complex sequence, giving rise to "full-complex" correlators. It is to be understood that the term "complex correlator" will be used hereinafter to refer to both of the aforementioned scenarios.

Following correlation, the complex correlation values are transmitted to complex multipliers 5 that multiply the correlation values by the complex weights that each consist of a real part and an imaginary part. Typically, only the real parts of the products of the complex correlation values and weights are sent to an accumulator 6, which sums the weighted correlations for all the signal rays processed. The accumulated result is sent to a threshold device 7, which detects a binary "0" if the input is greater than a threshold, or a binary "1" if the input is less than the threshold.

In mathematical terms, suppose $X(n)=I(n)+jQ(n)$ are the chip samples received by the receiver, where $I(n)$ are the I component samples, $Q(n)$ are the Q component samples, and n is the chip sample index corresponding to a respective discrete time. In FIG. 3, $I(n)$ are stored in buffer 2a and $Q(n)$ are stored in buffer 2b. The multiplexer 3 selects a range of I samples and a range of Q samples corresponding to the same ray. If $M(k,n)+M_I(k,n)+jM_Q(k,n)$ is the multiplexer output for ray k, giving N samples (n=0, ... N−1), then $M(k,n)=X(n+k)$ and $M_I(k,n)=I(n+k)$ and $M_Q(k,n)=Q(n+k)$.

The complex correlator 4a correlates the range of data samples from the multiplexer 3 to the known spreading code sequence. Consider data samples $X(k)$, $X(k+1), \ldots X(k+N-1)$, which are discrete time samples of the received data. If the receiver is trying to detect a code sequence C(0), C(1), ... C(N−1), which consists of N values (usually ±1 values), the correlator 4a correlates some set of N data values with the N code sequence values as follows:

$$R(k) = X(k)C(0) + X(k+1)C(1) + \ldots + X(k+N-1)C(N-1) = \sum_{n=0}^{N-1} X(n+k)C(n)$$

where the index k indicates where to start in the data sequence. This corresponds to a relative time of arrival of the signal, and as described above different arrival times correspond to different signal rays. Thus, ray k corresponds to a range of data values needed: $\{X(k), X(k+1), \ldots X(k+N-1)\}$. If N is large, rays k, k+1 correspond to ranges that substantially overlap.

The computation of R(k) can be performed by accessing the input data range in parallel or serially. Whether the correlation is performed in parallel or serially, each data value X(n) consists of b bits, which can be accessed and used all at once (parallel computation) or one at a time (bit serial approach).

FIG. 4 illustrates a parallel approach. A data buffer 53 stores consecutive time samples, X(n), of the received signal, and a multiplexer 54 selects a range of N data values, $\{X(k), X(k+1), \ldots, X(k+N-1)\}$, which are sent to a correlator 55. A group of multipliers 56, which corresponds to the inputs to the correlator 55, multiplies the data values by corresponding spreading code sequence values C(0), C(1), ... C(N−1). The products are summed by an adder 57 to form the correlation value R(k).

FIG. 5 illustrates serially accessing the input range to compute R(k). An input buffer 58 stores the received data samples. The buffer 58 may be only one sample long because only one sample will be correlated at a time. If the buffer 58 is more than one sample long, a multiplexer 59 would be provided to select a particular sample, X(k+i), where i is determined by a suitable control processor 60. The sample stored or selected is sent to a correlator 61, which computes the product of the sample X(k+i) with one element, C(i), of the code sequence using a multiplier 62. This product is combined by an adder 63 with the contents of an accumulator 64 that stores accumulated past products. The contents of the accumulator 64 is originally set to zero, and i is stepped from 0 to N−1, allowing the accumulation of N products. After N products have been accumulated, the contents of the accumulator 64 is output as the correlation value R(k).

Referring again to FIG. 3, regardless of the correlation approach used, the correlator 4a for ray k correlates the multiplexer output M(k,n) against the real code sequence C(n), producing a complex correlation value $R(k) = R_I(k) + jR_Q(k)$ where:

$$R(k) = \sum_{n=0}^{N-1} M(k,n)C(n)$$

and where:

$$R_I(k) = \sum_{n=0}^{N-1} I(n+k)C(n)$$

and where:

$$R_Q(k) = \sum_{n=0}^{N-1} Q(n+k)C(n)$$

The correlation values are multiplied by the complex weights $W(k) = W_I(k) + jW_Q(k)$, and the results are accumulated into the decision statistic, Z, which is given by:

$$Z = \sum_{\substack{k \\ W(k) \neq 0+j0}} Re\{W(k)R^*(k)\} = \sum_{\substack{k \\ W(k) \neq 0+j0}} W_I(k)R_I(k) + W_Q(k)R_Q(k)$$

The quantity Z is then thresholded in the threshold device 7 to determine whether a "−1" or a "+1" was sent.

FIG. 6 illustrates the general arrangement of a non-coherent DRAKE receiver 10 for a system using traditional CDMA with direct spreading. In a DRAKE receiver, the tap weights are either 0 or 1, which means simply that the correlation value from a particular tap is either added to a total or not; also, in non-coherent DRAKE, the square magnitudes of the selected correlation values are summed, which obviates the need to align them in phase before summing. Accordingly, the weights can be applied either before or after the square magnitudes are determined. The main difference from the coherent receiver shown in FIG. 3 is that the set of complex multipliers 5 that apply the complex weights to respective complex correlation values is replaced by a squared-magnitude processor 15a followed by weighting with 0 or 1 in a weight processor 15b.

In FIG. 6, a suitable receiver/digitizer 11 amplifies, filters, demodulates, analog-to-digital converts, and finally buffers the in-phase and quadrature components of the received composite radio signal into streams of complex digital samples I, Q. The sample streams I, Q are processed by a set 14 of correlators that compute the values of correlations of the sequence of signal samples with shifts of the receiver's spreading code sequence that are generated by respective ones of a set of local code generators. Of course, one code generator and suitable components for shifting the generator's code sequence can be used instead. For a multipath profile such as that shown in FIG. 1, the set 14 could comprise four correlators, one for each of four shifts of the spreading code, and the shifts of each code sequence would ideally correspond to the arrival times $T_0$–$T_3$. It will be understood that the signal sample streams I, Q may be processed either serially or initially collected in a memory and provided in parallel to the correlators.

Because the code sequences are typically only real-valued, either scalar correlators can separately operate on the I, Q samples or half-complex correlators can simultaneously compute the correlations of the I, Q samples with the code sequence shifts. In addition, the correlation values may be averaged over a number of transmitted symbols to determine an average signal strength for the decoded signal. The squared magnitudes of the four complex correlation values for the four shifts of the spreading code are then computed from the in-phase (real part) and quadrature (imaginary part) component samples by the squared-magnitude processor 15a.

The DRAKE multiplicative weighting coefficients are applied by the weight processor 15b to the squared magnitudes of the correlation values. Because in a DRAKE receiver the weights are only 0 or 1, processor 15b can also be regarded as a tap selection device. The four weighted magnitudes for the shifts of the spreading code are then combined by an adder 16. It will be appreciated that more or fewer than four shifts of each spreading code may be processed to handle other multipath profiles. Setting selected ones of the weights to zero as in a DRAKE receiver eliminates the contribution of the respective correlation magnitudes from the output of the adder 16, and thus can be used to ignore rays that may have been deemed rarely to contain significant signal energy.

The sum of the weighted correlation magnitudes for the spreading code is provided to a comparator device 17 for identifying the transmitted symbol. For a communication system employing block codes as spreading code sequences, the set 14 of correlators would advantageously include a sufficient number of correlators to process simultaneously all code sequences and their shifts, which would be produced by the local code generators. A set of a squared-magnitude processor, a weight processor, and an adder would be provided for each different spreading code sequence. The outputs of the adders for the set of spreading codes would be provided to the comparator device 17.

For a system using block codes, the output of the comparator device 17 is an index value representing the spreading code that produced the largest adder output. In a system using 128 Walsh-Hadamard orthogonal spreading codes, the comparator device 17 examines 128 adder outputs, yielding seven bits of information. Walsh-Hadamard codes are advantageous because a Fast Walsh Transform (FWT) processor, such as that described in commonly assigned U.S. patent application Ser. No. 07/735,805, can produce the 128 correlations for each shift of the spreading codes very rapidly. The comparator device 17 can advantageously be implemented by the maximum search processor described in commonly assigned U.S. Pat. No. 5,187,675. The above-cited application and patent are expressly incorporated here by reference.

In the coherent RAKE receiver, the complex weights scale the correlation values to maximize the overall signal-to-noise-and-interference ratio, and bring them into phase so that they are coherently added by the accumulator 6. Each complex weight is optimal when it is the complex conjugate of the mean of its respective correlation value. It will be understood that the very concept of "mean value" implies that the underlying correlation value is static and only varies due to additive noise. Since at least the phase of each correlation (i.e., $R_Q(k)$) varies due to relative motion between the receiver and transmitter, a device such as a phase-locked loop is usually used to track correlation variations in order to maintain the correct weight angle. In addition, the magnitudes of the complex weights should also track correlation value variations due to varying signal-reflection characteristics of the objects causing the echoes.

In a CDMA system using 128 Walsh-Hadamard orthogonal spreading codes, a non-coherent RAKE receiver expecting a four-signal multipath profile requires 1024 squaring computations to develop the squared magnitudes from the real and imaginary parts of the correlation values and 512 multiplications to apply the weights. For such a system and profile, a coherent RAKE receiver requires at least 2048 multiplications to apply the complex weights to the correlation values. From a processor hardware point of view, multiplication is generally more difficult than squaring because multiplication involves two input arguments rather than one. Therefore, a coherent RAKE receiver is typically more complicated than a non-coherent RAKE receiver.

SUMMARY

In accordance with Applicant's invention, the complex weights used in the coherent RAKE receiver are coarsely quantized, i.e., the values of their real and imaginary parts are limited, such that multiplication can be implemented by appropriate digital shifting. For binary data processing, the weight values are advantageously limited to inverse powers of two. Applicant's invention provides a simpler implementation of a coherent RAKE receiver that has higher performance, but is less complex, than a non-coherent RAKE receiver.

In one aspect, Applicant's invention encompasses a method for decoding a CDMA signal comprising the steps of correlating at least two time shifts of a received signal against a spreading code and weighting the results according to coefficients selected from a coefficient store. The time shifts correspond to a transmitted data symbol, the spreading code and its complement correspond to different transmitted data symbols, and each coefficient has a sign and a value that is an integer power of two and corresponds to a respective time shift. The method further includes the steps of summing the results of the weighting step for each time shift in a respective accumulator, and determining a sign of the accumulator sums to decode the transmitted data symbol.

In another aspect of Applicant's invention, an apparatus for decoding CDMA signals comprises means for correlating at least two time shifts of a received signal with a spreading code, the spreading code and its complement corresponding to different transmitted data symbols and the at least two time shifts corresponding to a transmitted data symbol. The apparatus further comprises means for weighting the correlations according to respective ones of at least two coefficients, each coefficient having a sign and a vlaue that is an integer power of two and corresponding to a respective time shift. The apparatus also comprises means for summing the weighted correlations for each time shift and means for determining a sign of the sum to decode the transmitted data symbol.

In other aspects of Applicant's invention, a method and apparatus further includes a step of or means for subtracting a waveform corresponding to the decoded transmitted data symbol from the received signal. In a further aspect of Applicant's invention, the method includes correlating at least two time shifts against at least two spreading codes, the spreading codes corresponding to different transmitted signals, and summing the results of the weighting step for each time shift in a respective accumulator for each spreading code. In another aspect of Applicant's invention, the weighting coefficients used for succeeding transmitted data symbols are based on previous correlation results and decoded transmitted data symbols. Yet other aspects of Applicant's invention are described below.

The performance of a quantized coherent RAKE receiver in accordance with the invention is better than that of a non-coherent RAKE receiver, and is almost as good as that of a conventional coherent RAKE receiver using non-quantized complex weights. In addition, the quantized coherent RAKE receiver is less complex than either conventional receiver because shifting operations are less complicated than both squaring and multiplication operations.

BRIEF DESCRIPTION OF THE DRAWINGS

The features and advantages of the invention will become apparent from reading the following detailed description in conjunction with the drawings in which:

FIG. 8 shows a series of graphs illustrating how CDMA signals are generated;

FIGS. 9 and 10 show a series of graphs for illustrating how CDMA signals are decoded;

FIG. 11 shows a series of graphs illustrating a subtractive CDMA demodulation technique.

DETAILED DESCRIPTION

The following description is given in a context of a CDMA communication system using offset QPSK (OQPSK) modulation and 128 Walsh-Hadamard orthogonal spreading codes, but it will be appreciated that the invention can be used with other communication schemes, including binary PSK using one spreading code.

Figure 1:
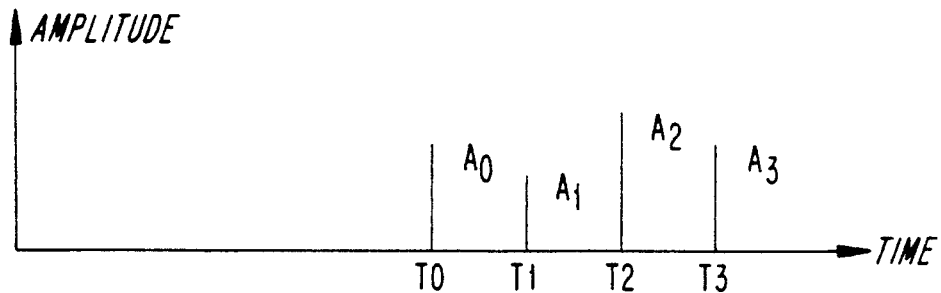
FIG. 1 illustrates a received signal having main-path and echo components.
Figure 2A:
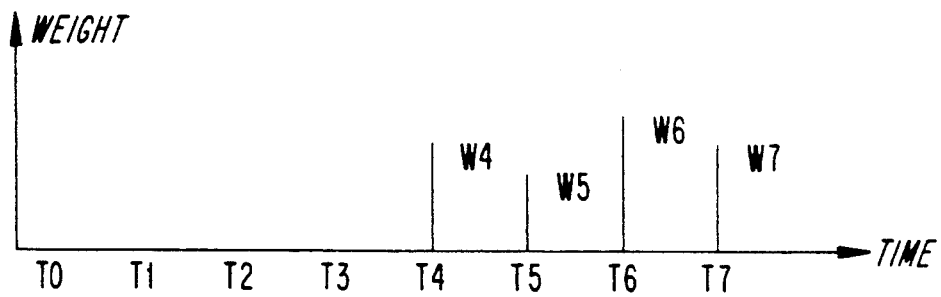
FIGS. 2A and 2B illustrate weights that might be applied to a signal arriving at different times.
Figure 2B:
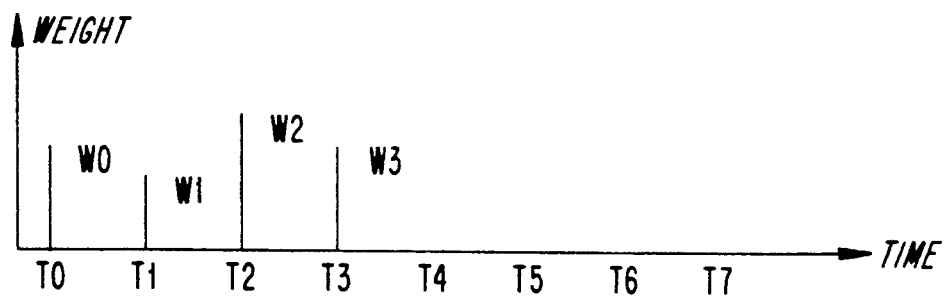
Figure 3:
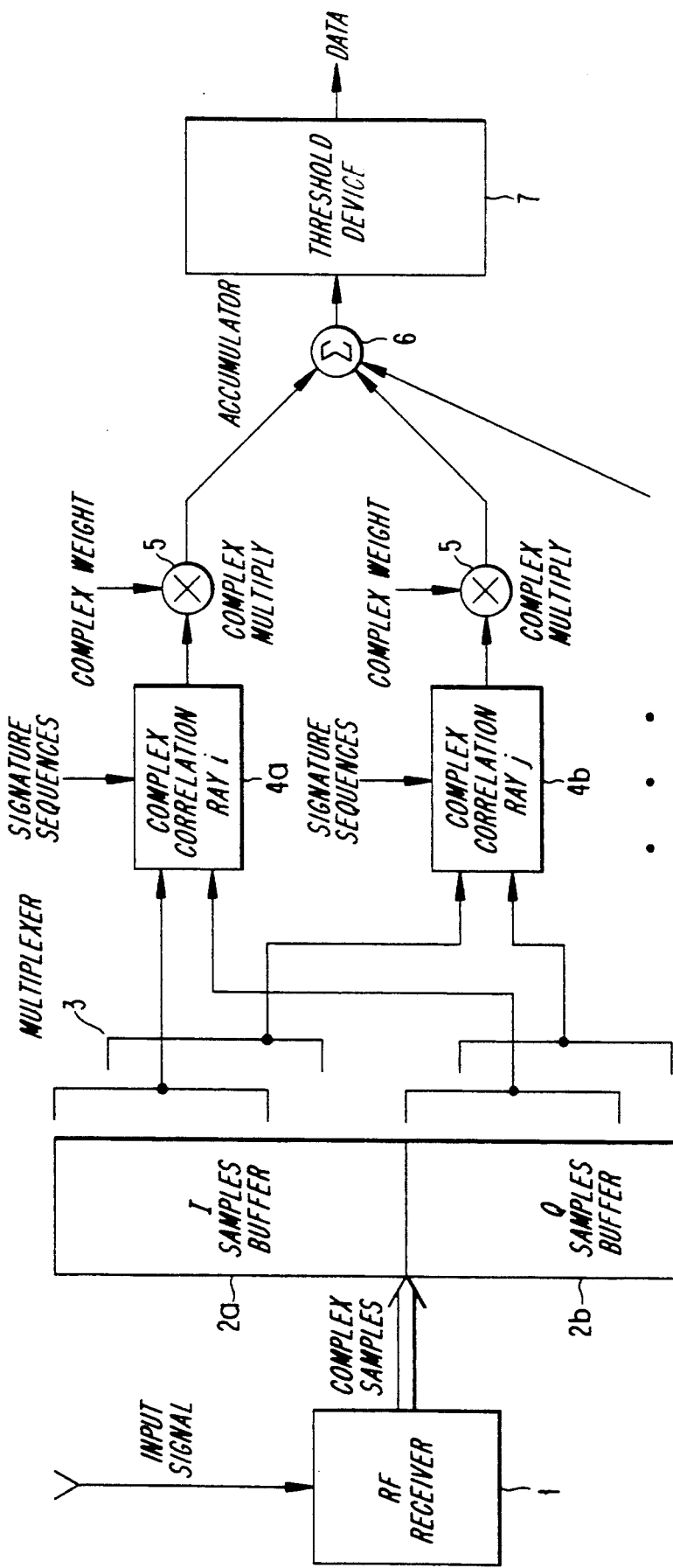
FIG. 3 is a block diagram of a conventional RAKE receiver using post-correlator, coherent combining of different rays.
Figure 4:
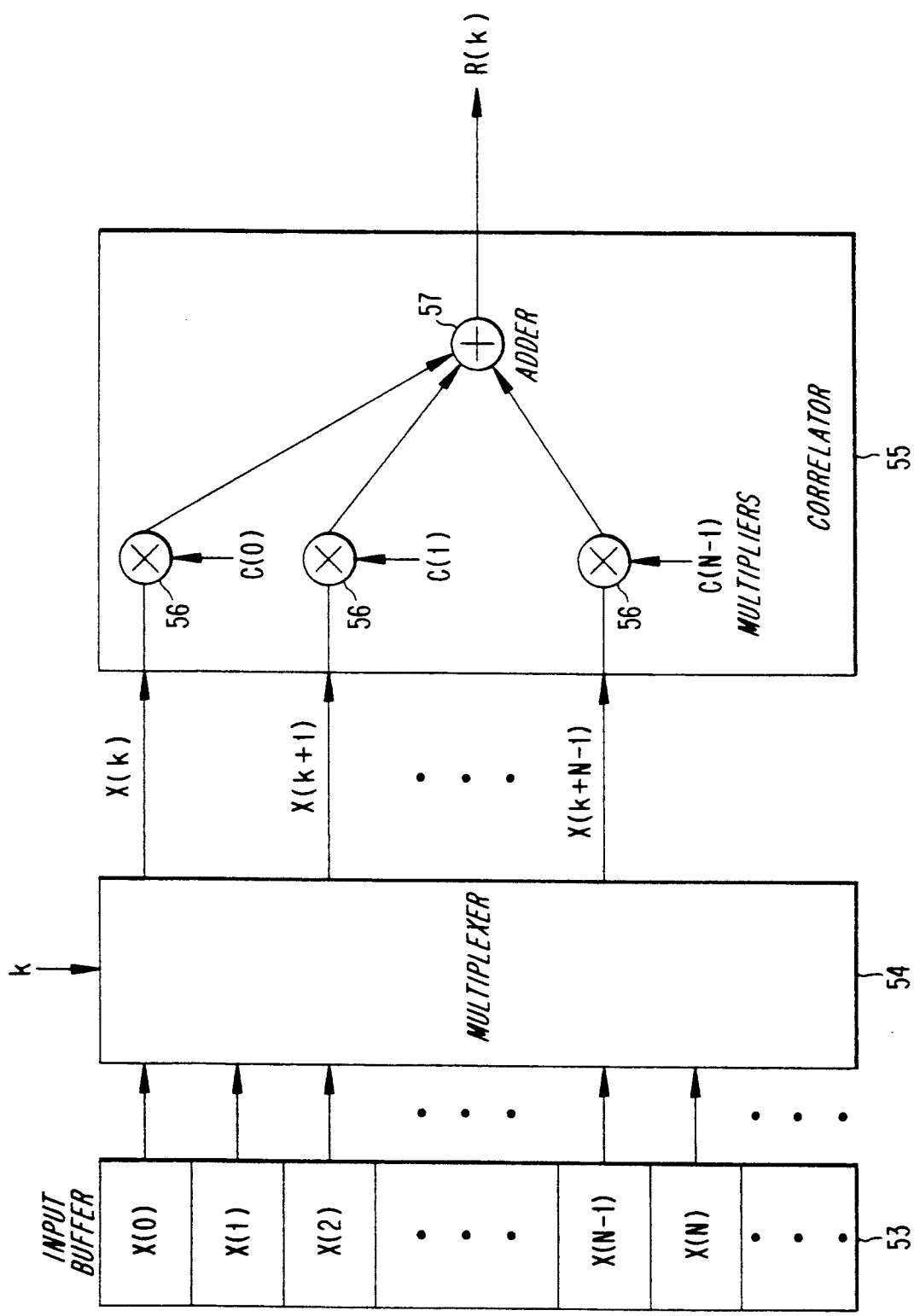
FIG. 4 illustrates a parallel approach to the computation of the correlation R(k)
Figure 5:
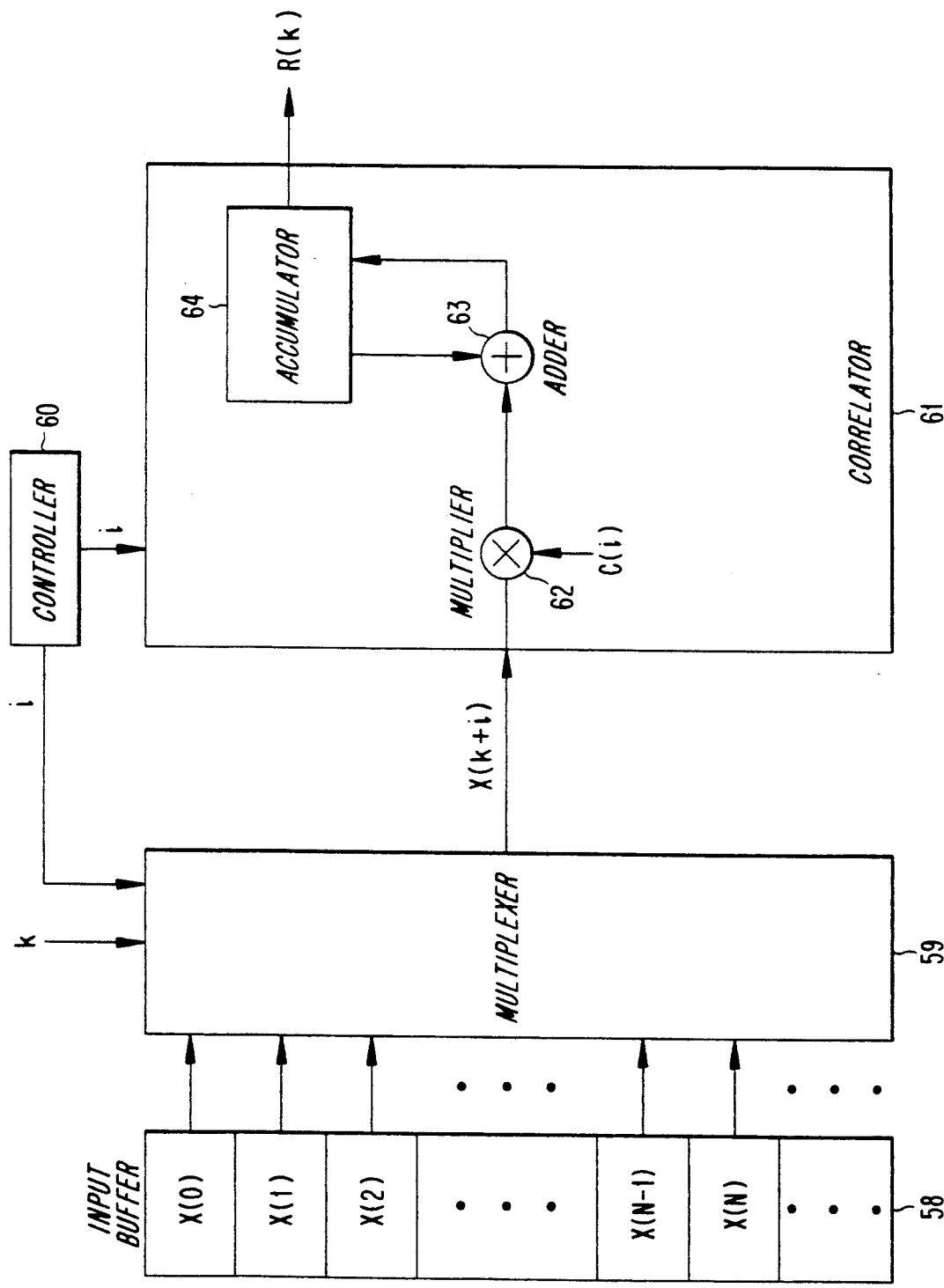
FIG. 5 illustrates a serial approach to the computation of the correlation R(k)
Figure 6:
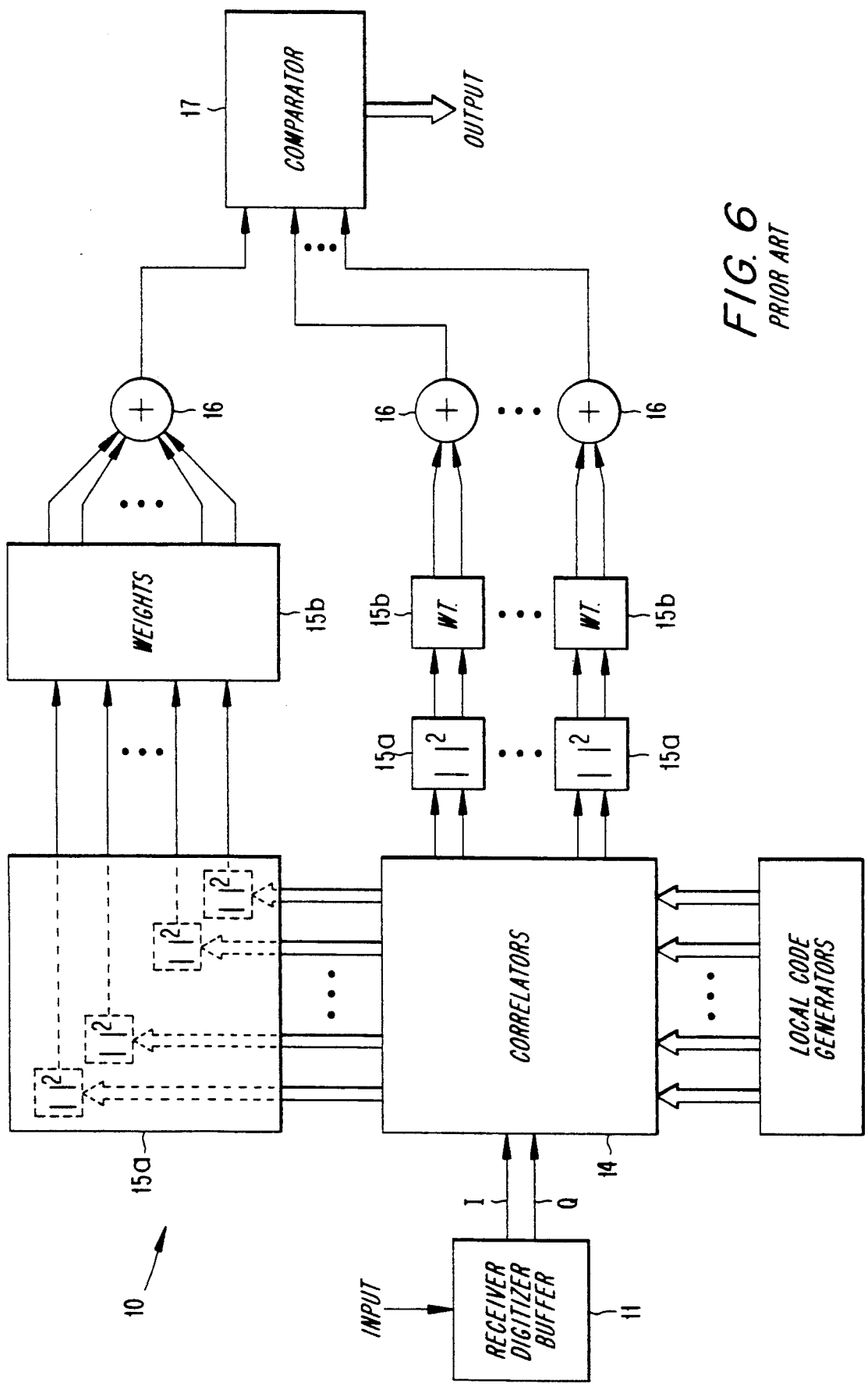
FIG. 6 is a block diagram of a conventional non-coherent DRAKE receiver.
Figure 7:
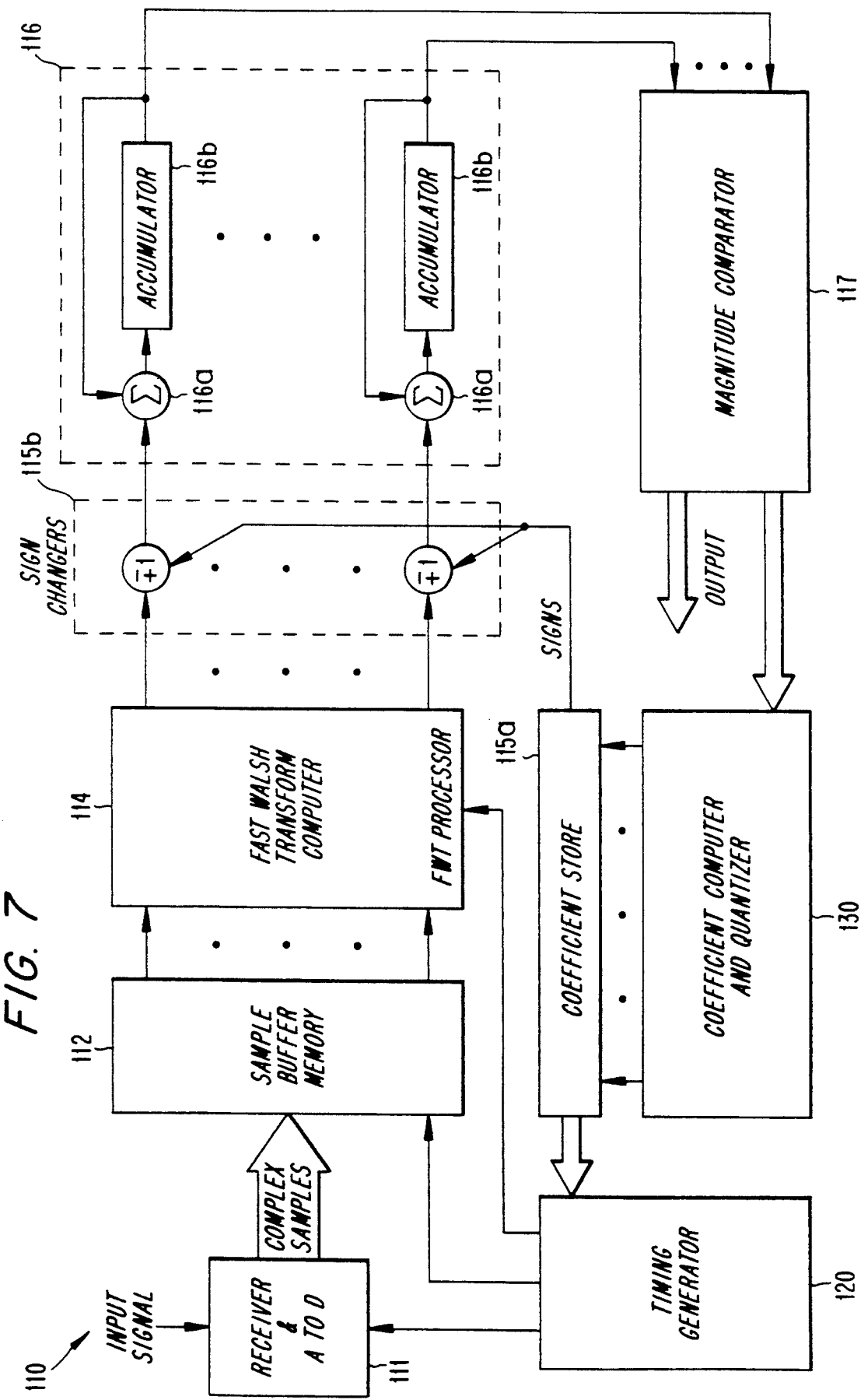
FIG. 7 is a block diagram of a quantized coherent RAKE receiver in accordance with Applicant's invention.

A block diagram of a quantized coherent RAKE receiver 110 in accordance with Applicant's invention is shown in FIG. 7. A receiver 111 appropriately amplifies, downconverts, and filters a received composite radio signal, and analog-to-digital converts the result. Digital I, Q samples of the inphase and quadrature signal components are collected in a sample buffer memory 112. The timing of A/D conversion and sample transfer into the buffer are coordinated with other receiver processes, such as carrier frequency synchronization, by means of a suitable timing generator 120. After 128 complex samples are collected in the buffer 112, the timing generator 120 enables an FWT processor 114 to compute 128 correlations with the contents of the sample buffer.

Using the exemplary OQPSK modulation, alternate chips of the spreading code appear shifted 90 degrees compared with those in between, e.g., even chips may appear in the I channel and odd chips in the Q channel. Accordingly, a systematic 90-degree pre-rotation of the phase may be applied to align the phase of odd chips with those of even chips. A known method is to apply a systematically increasing rotation of 0, 90, 180, 270, 360 (=0), 90, 180, . . . degrees to sequentially received complex samples spaced one chip apart, equivalent to a frequency shift of ¼ the chip rate. Considering only the even chips, for example, it will be appreciated that the even chips have suffered a systematic rotation of alternately 0, 180, 0, 180, . . . degrees, which means every alternate even chip has been inverted, as has every alternate odd chip. This, however, is compensated at the transmitter by the process known as "precoding," which essentially inverts every alternate even and odd bit upon modulation such that, after the receiver's systematic pre-rotation, the chip polarities will once more be those of the intended chip sequence.

Despite the above described measures used to align even and odd chips into the same phase plane, the unknown phase due to radio propagation across a distance of millions of wavelengths means that this phase plane may be the real plane, the imaginary plane, or anywhere in between. Accordingly, the FWT processor 114 must correlate both the real and imaginary parts of the signal to guarantee that all received signal energy is encompassed.

The FWT processor 114 advantageously employs serial arithmetic internally as disclosed in U.S. patent application Ser. No. 07/735,805 that was incorporated above by reference. Such a FWT processor efficiently processes M binary input values presented serially, least significant bit ("LSB") first, on M respective conductors or inputs. It will be appreciated that two 128-point FWT processors may be provided for computing in parallel the complex correlations' real parts (from the in-phase samples) and imaginary parts (from the quadrature samples). On the other hand, one 128-point FWT processor may be provided for computing the real and imaginary parts sequentially if processing time allows.

The FWT processor's use of serial arithmetic facilitates the application of complex RAKE weights in accordance with Applicant's invention. If the weight values are quantized to inverse powers of two, the correlation values can be scaled simply by suitably delaying use of the serial bit stream produced by the FWT processor 114. Delaying the use of the FWT processor's output bit stream by one bit has the effect of multiplying the correlation values by one-half; delaying use of the output by two bits "multiplies" by one-quarter; and so on. Thus, for example, to divide by 2, the first bit to emerge (the least significant bit) is not used. The next bit to emerge is then used as the least significant, and so forth until the last bit has emerged. The last bit to emerge is then held and reused as a sign extension bit until the required number of output bits has been used. These delays can be easily effected by the timing unit 120's issuing clock pulses to the FWT processor 114 and buffer memory 112 at appropriately different times.

In addition, it will be appreciated that the timing unit can selectively delay the clock pulses by a first amount to implement the appropriate weight values for the correlations' real parts and then selectively delay the clock pulses by a second amount to implement different weight values for the correlations' imaginary parts.

It will be noted that correlation values on taps having smaller coefficients may be determined first, and the parts of the FWT hardware for real and imaginary parts can be switched to determine correlation values on different buffer shifts. For example, if tap/shift 1 has real coefficient 1 and imaginary coefficient ¼ and tap/shift 3 has real coefficient $-\frac{1}{4}$ and imaginary coefficient $-\frac{1}{2}$, it may be practically advantageous first to have the real FWT determine tap 3 at the same time as the imaginary FWT determines tap 1. In that way, the taps with coefficients ¼ are used first. These are added into the accumulators, and then the FWTs for coefficients ½ are determined. Since the latter determinations must be added into the accumulators with double the significance of the former determinations, delaying the serial bit streams (or advancing recirculating accumulator contents to discard the least significant bit) is appropriate. This modification of the currently preferred implementation can be practically advantageous.

Scaling profiles, i.e., the weights, for each correlation's real and imaginary parts may be imposed by using parameters stored in a coefficient memory 115a to control ± sign changes imposed by a sign changer 115b. The sign changer 115b may, for example, be a combination of an inverting gate and a selection switch that selects either the gate's output stream or its input stream according to whether or not a sign change is desired. Such a combination may also simply be implemented by an exclusive-OR gate.

The scaled and sign-changed correlation values are bitwise summed in 128 accumulators 116, each accumulator being dedicated to a respective FWT output point and advantageously comprising a bit-serial adder 116a and a recirculating bit-serial memory 116b. Thus, scaling occurs before the correlations are fully developed, i.e., as the correlation values are serially produced.

It will be noted that the embodiment of the sign changer 115b described above does not produce an exact two's complement negation of values, since two's complement negation is actually performed by complementing the bits and then adding 1 to the complemented value. However, since the "add 1" operation is performed at an LSB, it can often be neglected if the word length (precision) is adequate without it. Alternative ways of dealing with rounding such as this, and such as in the case of discarding of the LSB in the "delay" procedure above, are to preset the carry flip-flop of the bit-serial adder 116a to 1 when negating, or presetting to 1 when dividing if the discarded LSB is a 1.

The contents of the sample buffer 112 are then time-shifted one or more samples according to the delay of the next ray, and the FWT processor 114 computes correlations as described above using the shifted samples. These correlations are scaled and sign-changed according to their own corresponding coefficients retrieved from the coefficient memory 115a. In this way, sets of 128 complex correlations are computed for a plurality of shifts of the received samples, i.e., for a plurality of rays.

In accordance with Applicant's invention, the real and imaginary parts of the correlation values from each RAKE tap are weighted by values selected from the series ±1, ±½, ±¼, ... according to their relative importance and sign, as determined by observing their mean values over a period longer than one information symbol. The currently preferred implementation, although only exemplary, is one in which information symbols consist of groups of seven bits used to select one of 128 orthogonal 128-chip codewords for transmission. The signal received at the receiver is sampled at least once per chip and the samples are fed sequentially to a buffer store containing at least 128-chip's worth of samples.

The FWT processor processes 128 samples from the buffer taken one chip apart to produce 128 correlation values corresponding to the 128 possible transmitted codewords. These 128 values are the correlations from one RAKE tap corresponding to the particular shift of the received data samples plucked from the buffer. The 128 real values are subject to weighting by the quantized coefficient determined for the real part of that tap and weighted values accumulated in 128 accumulators 116 respectively. Likewise the 128 imaginary values are weighted by the quantized coefficient determined for the imaginary part of that tap and accumulated in the 128 accumulators. Upon receipt of another signal sample, it is then shifted into the buffer and the oldest sample in the buffer falls outside the FWT 128-chip window. The buffer memory should thus be large enough to contain the number of signal samples corresponding to 128+L chips, where L is the number of RAKE taps. The FWT then produces 128 further correlations using the new shift of samples in the buffer corresponding to a different RAKE tap, and the real and imaginary parts of those are weighted with the quantized coefficients determined for that tap before accumulation.

After all desired RAKE taps have been processed in the above way, the 128 accumulators contain the sum of the weighted correlations from each tap. Determining the largest of these indicates the most likely codeword transmitted, yielding seven bits of information. The largest of accumulators 116 is determined by magnitude comparator device 117, which may operate according to the invention disclosed in U.S. Pat. No. 5,187,675 that was incorporated above by reference.

Having determined the transmitted codeword in this way, the correlation with that codeword from each RAKE tap is selected, either by remembering the original correlations in a memory and then accessing it, or by reprocessing each buffer shift again but this time with the need to calculate only one correlation value per shift corresponding to the decided codeword. The real and imaginary parts of each correlation are then separately averaged by a coefficient computer and quantizer 130, which provides an averager for each candidate RAKE tap, and the average values are used in determining the quantized weighting coefficients for each tap that are to be used for accumulating correlation values to decode the next transmitted symbol.

For example, assume that the averagers for a set of RAKE taps produce the values in the table below. The appropriate quantized weighting coefficients determined by the computer and quantizer 130 for the next transmitted symbol might then be as shown in the rightmost column.

| TAP | TAP AVERAGE | | QUANTIZED COEFFICIENT | |
|---|---|---|---|---|
| | REAL | IMAG | REAL | IMAGINARY |
| 1 | 0.9 | −0.1 | 1 | 0 |
| 2 | −0.71 | 0.69 | −1 | ½ |
| 3 | 0.28 | −0.6 | ¼ | −½ |
| 4 | 0.13 | −0.22 | 0 | −¼ |

The averagers implemented in the computer and quantizer 130 to produce the tap averages may operate according to any one of a number of known methods, such as block moving averaging, exponential forgetting, or Kalman filtering. The latter, which is the currently preferred method, operates by predicting a next value using a time-derivative estimate, using the predicted value as the tap average to determine the quantized coefficients as illustrated above, using the coefficients to combine the taps and decode a codeword, then correcting the prediction and the time derivative estimate when the correlation value with the decoded codeword is available. The preferred Kalman filter may also advantageously compute an estimate of the time-derivative of tap phase, that is a frequency error, in order to better predict the complex value of the next correlation by applying the phase rotation anticipated over a symbol period to the previous, corrected prediction in order to obtain the next prediction. This may be done in addition to using real and imaginary time-derivatives to anticipate the new real and imaginary values one symbol period later. A weighted average over all taps of their corresponding phase derivatives is also a good indication of signal frequency error due to transmitter and receiver oscillator errors, and can be used to apply a compensating anti-rotation to received signal samples as a form of Automatic Frequency Control (AFC), and/or to correct the receiver's reference frequency oscillator.

It will be appreciated that averaging the correlation values over a number of transmitted symbols determines the average signal strength because the information is carried by the orthogonal Walsh block codewords, not by sign reversals of a spreading code sequence. Accordingly, correlations with all possible codes are formed and the largest correlation determined. The value of the largest correlation, assuming a correct decision was made and noise did not cause a symbol error, is the same from block to block, irrespective of the underlying seven information bits, and varies only relatively slowly in phase and amplitude at the channel fading rate. For example, if the channel results in a received signal amplitude of 0.32 with a phase of 45 degrees and code C4 is transmitted, then 0.32·( cos (45)+j·sin (45))·C4 is received and that complex value pops up in bin 4 of the FWT. If code C97 is next transmitted and the channel has changed slightly so that the received signal has an amplitude of 0.29 with a phase of 53 degrees, then the complex value 0.29·( cos (53)+j·sin (53)).C97 pops up in bin 97 of the FWT. Averaging the values from the largest FWT bins yields the following:

$$X_{mean} = (0.32 \cdot \cos (45) + 0.29 \cdot \cos (53))/2$$

$$Y_{mean} = (0.32 \cdot \sin (45) + 0.29 \cdot \sin (53))/2$$

which are the proper mean values.

It will be recognized that when binary signalling is used, it is necessary to remove the inversion or modulation caused by the information before averaging. For example, in a system using binary PSK modulation, the information is carried by sign reversals of a single spreading code sequence according to the values of the data bits; the spreading code and its complement correspond to different respective transmitted data symbols. The sign of the one correlation value yields the decoded binary data bit. Thus, the coefficient computer and quantizer 130 removes the binary PSK modulation before averaging by, for example, using the output of the RAKE combiner (i.e., the output of the magnitude comparator 117) as a best estimate of the sign of the data modulation, and the re-inverting the correlation value from each RAKE tap accordingly before averaging the correlations.

A better alternative is for the computer and quantizer 130 to use the output of the RAKE combiner as "soft" bit values in an error correction decoding process. The computer and quantizer 130, which would thus be equivalent to a convolutional decoder, would then use the corrected bits, which are much more likely to be right, to undo the phase and/or amplitude changes caused by the data modulation before averaging the RAKE tap values. This implies a delay for a data bit to propagate sufficiently far through the error correction decoder to become more or less "firm," so the RAKE tap values have to be saved in a buffer of length equal to this delay for averaging after the data bits are determined. As long as this delay is small compared with the rate at which the channel changes due to fading, no problem arises.

The functions of the coefficient computer and quantizer 130 are described in additional detail below.

Figure 8:
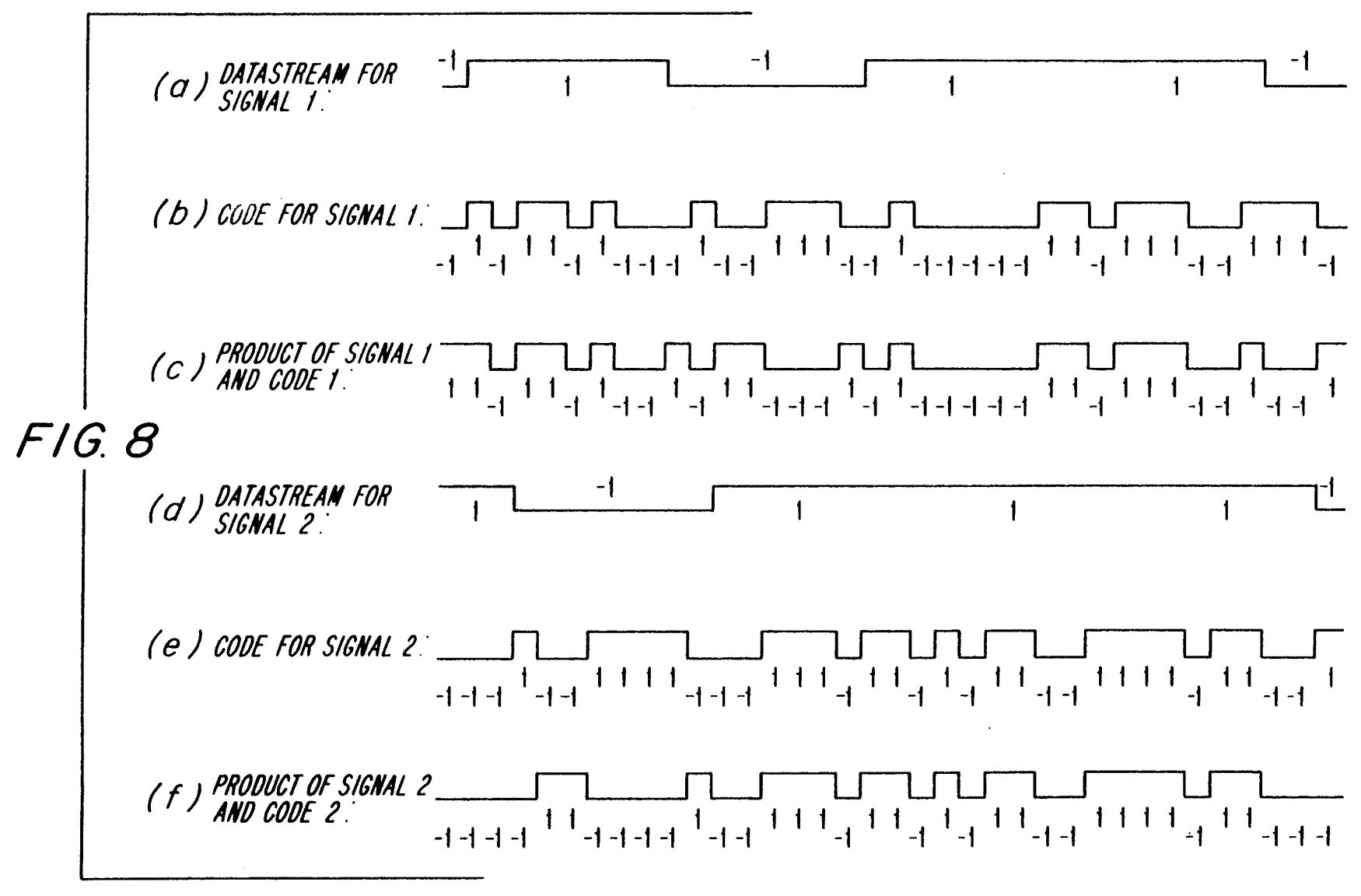

The quantized coherent RAKE receiver 110 advantageously operates with subtractive CDMA demodulation as described in commonly assigned U.S. Pat. No. 5,151,919 and allowed Application Ser. No. 07/739,446 filed on Aug. 2, 1991. In the systems described in these applications, which are expressly incorporated here by reference, the real and imaginary parts of the largest correlation are set to zero, thereby removing the signal just detected, and inverse transforms are performed to return samples to the buffer memory from which the signal just detected has been subtracted. The forward correlation process is then repeated. FIGS. 8-10 set forth example waveforms in the coding and decoding processes involved in traditional CDMA systems. Using the waveform examples from FIGS. 8-10, the improved performance of a subtractive CDMA demodulation technique is illustrated in FIG. 11.

Two different datastreams, shown in FIG. 8 as signal graphs (a) and (d), represent digitized information to be communicated over two separate communication channels. Information signal 1 is modulated using a high-bit-rate, digital code that is unique to signal 1 and that is shown in signal graph (b). The result of this modulation, which is essentially the product of the two signal waveforms, is shown in the signal graph (c). In Boolean notation, the modulation of two binary waveforms is essentially an exclusive-OR operation. A similar series of operations is carried out for information signal 2 as shown in signal graphs (d)-(f). In practice, of course, many more than two coded information signals are spread across the frequency spectrum available for cellular telephone communications.

Each coded signal is used to modulate a radio frequency (RF) carrier using any one of a number of modulation techniques, such as QPSK. In a cellular telephone system, each modulated carrier is transmitted over an air interface. At a radio receiver, such as a cellular base station, all of the signals that overlap in the allocated frequency bandwidth are received together. The individually coded signals are added, as represented in the signal graphs (a)-(c) of FIG. 9, to form a composite signal waveform (graph (c)).

After demodulation of the received signal to the appropriate baseband frequency, the decoding of the composite signal takes place. Information signal 1 may be decoded or despread by multiplying the received composite signal shown in FIG. 9(c) with the unique code used originally to modulate signal 1 that is shown in signal graph (d). The resulting signal is analyzed to decide the polarity (high or low, +1 or −1, "1" or "0") of each information bit period of the signal. The details of how the receiver's code generator becomes time synchronized to the transmitted code are known in the art.

These decisions may be made by taking an average or majority vote of the chip polarities during each bit period. Such "hard" decision making processes are acceptable as long as there is no signal ambiguity. For example, during the first bit period in the signal graph (f), the average chip value is +1.00 which readily indicates a bit polarity +1. Similarly, during the third bit period, the average chip value is +0.75, and the bit polarity is also most likely a +1. However, in the second bit period, the average chip value is zero, and the majority vote or average test fails to provide an acceptable polarity value.

In such ambiguous situations, a "soft" decision making process must be used to determine the bit polarity. For example, an analog voltage proportional to the received signal after despreading may be integrated over the number of chip periods corresponding to a single information bit. The sign or polarity of the net integration result indicates that the bit value is a +1 or −1.

The decoding of signal 2, similar to that of signal 1, is illustrated in the signal graphs (a)–(d) of FIG. 10. However, after decoding, there are no ambiguous bit polarity situations.

In contrast to conventional CDMA, an important aspect of the subtractive CDMA demodulation technique is the recognition that the suppression of friendly CDMA signals is not limited by the processing gain of the spread spectrum demodulator as is the case with the suppression of military type jamming signals. A large percentage of the other signals included in a received, composite signal are not unknown jamming signals or environmental noise that cannot be correlated. Instead, most of the noise, as defined above, is known and is used to facilitate decoding the signal of interest. The fact that the characteristics of most of these noise signals are known, including their corresponding spreading codes, is used in the subtractive CDMA demodulation technique to improve system capacity and the accuracy of the signal decoding process. Rather than simply decode each information signal from the composite signal, the subtractive CDMA demodulation technique also removes each information signal from the composite signal after it has been decoded. Those signals that remain are decoded only from the residual of the composite signal. Consequently, the already decoded signals do not interfere with the decoding of the remaining signals.

For example, in FIG. 11, if signal 2 has already been decoded as shown in the signal graph (a), the coded form of signal 2 can be reconstructed as shown in the signal graphs (b) and (c) (with the start of the first bit period of the reconstructed datastream for signal 2 aligned with the start of the fourth chip of the code for signal 2 as shown in FIG. 8 signal graphs (d) and (e)), and subtracted from the composite signal in the signal graph (d) (again with the first chip of the reconstructed coded signal 2 aligned with the fourth chip of the received composite signal) to leave coded signal 1 in the signal graph (e). This is easily verified by comparing signal graph (e) in FIG. 11 with signal graph (c) in FIG. 8 (truncated by removing the first three and the very last chip). Signal 1 is recaptured easily by multiplying the coded signal 1 with code 1 to reconstruct signal 1. Note that because the bit periods of datastreams for signals 1 and 2 are shifted relative to one another by 2 chips there are only six +1 chips in the first bit period of the recaptured signal 1 shown in FIG. 11 signal graph (f). It is significant that while the conventional CDMA decoding method was unable to determine whether the polarity of the information bit in the second bit period of signal 1 was a +1 or a −1 in signal graph (f) of FIG. 9, the decoding method of the subtractive CDMA demodulation technique effectively resolves that ambiguity simply by removing signal 2 from the composite signal.

As described above, the re-calculation of correlations by the FWT processor 114 on different shifts of the sample buffer and the successive subtraction of the correlations of the detected signals are preferably done in order of correlation strength from strongest to weakest. During this process, the quantized coherent RAKE receiver 110 shown in FIG. 7 recomputes the correlations of the component deemed to be greatest, and the result is transferred from the comparator device 117 to the RAKE coefficient computer and quantizer 130, which is described in more detail below.

It will be appreciated that the quantized coherent RAKE receiver 110 can advantageously be used in communication systems in which Walsh-Hadamard spreading codes are modified by the bit-wise modulo-2 addition of predetermined scrambling bit patterns. Such systems are described in commonly assigned U.S. Pat. Application Ser. No. 07/866,865 filed on Apr. 10, 1992, for "Multiple Access Coding for Mobile Radio Communications", which is expressly incorporated here by reference.

Figure 12:
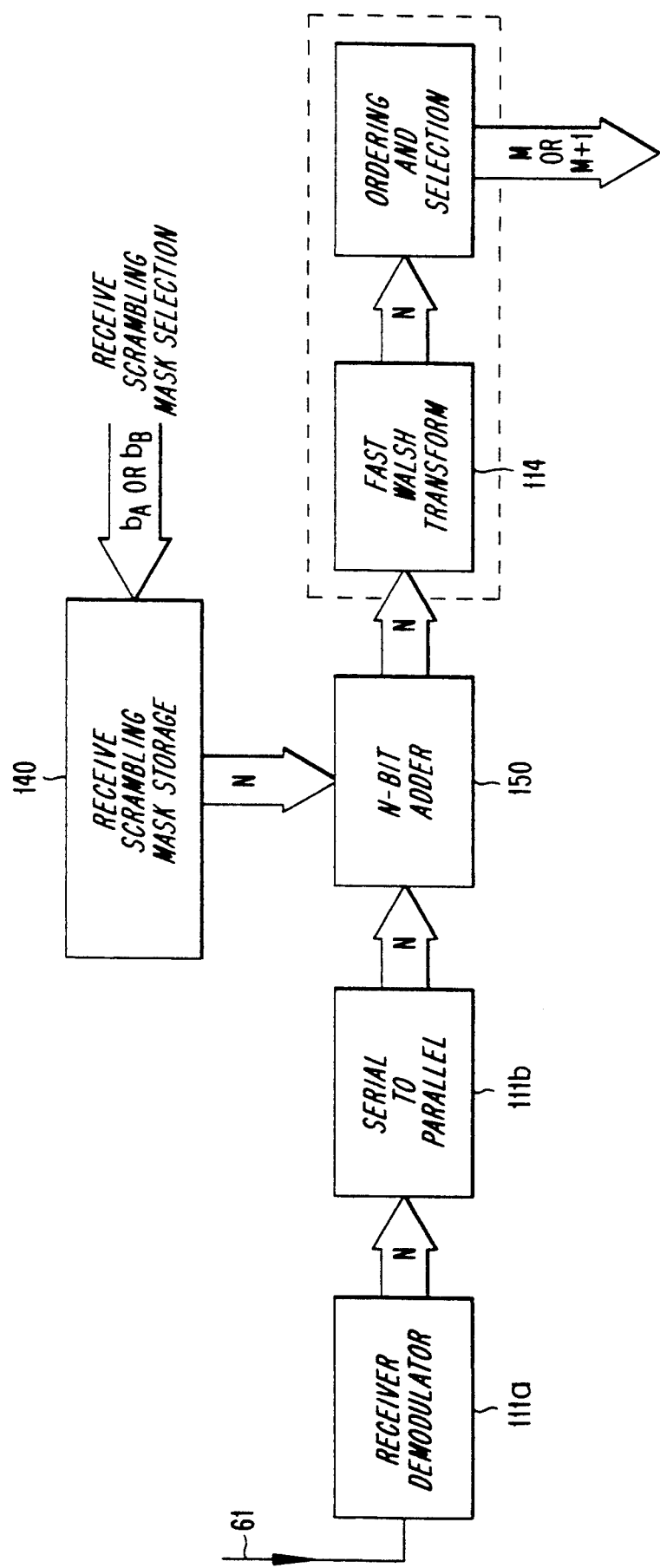
FIG. 12 is a partial block diagram of a RAKE receiver for signals employing scrambling masks.

FIG. 12 shows a portion of the RAKE receiver shown in FIG. 7 with the additional components needed for operation with scrambling bit patterns, or scrambling masks, having the properties described in the above-cited patent application. These scrambling masks are advantageously stored as a look-up table in a RAM or ROM memory, for example, from which a particular mask is retrieved by supplying its associated address. While described in terms of a memory look-up table, it will be appreciated that a suitable code generator, such as a digital logic circuit or microcomputer, that produces on-line the scrambling masks indicated by selection control input signals may also be used.

The composite signal received by an antenna is provided to a receiver demodulator 111a that demodulates received serial samples of the composite signal. A serial-to-parallel converter 111b converts the serial samples into parallel blocks of signal samples (which may be complex, corresponding to in-phase and quadrature signal components). The order in which each information signal is decoded in the receiver is determined by the receive scrambling mask selection address $b_A$ or $b_B$ applied to a scrambling mask memory 140. The parallel samples buffered in the serial-to-parallel converter 111b are bitwise exclusive-ORed or modulo-2 added to the scrambling mask retrieved from the memory 140 by an N-bit adder 150. If the received samples are complex, different scrambling masks could be used for the in-phase and quadrature components. The descrambled signals are then decoded by the remainder of the RAKE receiver, including the FWT circuit 114, as described above.

In such a system, source information, e.g., speech, is converted to blocks of M (or M+1) binary bits, and these bit blocks are encoded with error correcting orthogonal (or bi-orthogonal) block codes. The orthogonal $2^M$-bit block codewords are scrambled by modulo-2 N-bit addition of a scrambling mask that may be retrieved from a look-up table in memory. In the case of ideal scrambling masks, there may be either $n_A = N^{\frac{1}{2}}$ or $n_B = N/2$ scrambling masks, depending on which method was used to generate the scrambling mask set. Thus, the number of bits needed to address each mask from the memory is either $b_A = \log_2(n_A)$ or $b_B = \log_2(n_B)$, and by transmitting the $b_A$-bit or $b_B$-bit scrambling mask selection address associated with a particular scrambling mask to the memory, that mask is retrieved from storage and modulo-2 added to the block coded signal.

The ability selectively to address and retrieve a specific scrambling mask becomes important in determining the order in which signals are decoded from a received composite signal. For example, if stronger coded information signals are decoded first and removed from the composite signal before weaker signals are decoded, the scrambling masks must be ordered by the signal strength of their associated, coded information signals. In CDMA subtractive demodulation according to the patent and patent application incorporated by reference above, the scrambling mask corresponding to the strongest information signal would be selected for decoding. After that signal is removed, the scrambling mask corresponding to the next strongest information signal is selected and so forth until the weakest signal is decoded.

The RAKE coefficient computer and quantizer 130 determines, from the sequence of selected complex correlation values presented to it by the comparator 117, the mean value and trend of the real and imaginary transform components. These are used by the computer 130 to predict the values that will occur in the next analysis period, and thereby the weights that should be retrieved from the coefficient memory 115a. Thus, the receiver 110 can adapt to changing multipath conditions. The computations carried out by the computer 130 generally require a digital signal processor such as a model TMS320C50 available from Texas Instruments.

The predicted values are preferably normalized to the magnitude of the largest, which is assigned the value $\pm 1$; the remainder are quantized as follows:
 if magnitude $> 0.7$, then quantize to $\pm 1$;
 if $0.35 <$ magnitude $< 0.7$, then quantize to $\pm 0.5$;
 if $0.175 <$ magnitude $< 0.35$, then quantize to $\pm 0.25$; and
 if magnitude $< 0.175$, then quantize to 0.0. Thus, predicted transform values are coarsely quantized to preferably four levels.

The computer 130's prediction of the correlation values for the next analysis interval from previous values can, in the simplest case, just involve predicting that the next values will be the same as the previous values.

In cases where the correlations are changing slowly, a better prediction is that the future correlations will be a running average of corresponding previous values; the running average can be developed from previous values in a moving window of predetermined width, either with equal weights or with exponentially decreasing weights for older results (the latter is sometimes called "exponential forgetting"). Letting $Z(i)$ stand for a complex correlation at time instant i and $\underline{Z}(i)$ stand for the running average at time instant i of previous complex correlations, a suitable prediction for the next running average is given by the following expression:

$$\underline{Z}(i+1) = \underline{Z}(i) + (Z(i) - \underline{Z}(i))/4.$$

This expression has exponential forgetting over a running window of four correlation intervals. For a $4 \times 128$-chip interval, exponential forgetting is appropriate so long as signal amplitude and phase changes due to fading are not excessive over this interval. Fading rates are related to Doppler shifts and these lie in the spectral range of about 0–100 Hz for legal vehicle speeds and radio frequencies around 1 GHz. Consequently, the $4 \times 128$-chip interval could span $\frac{1}{4}$ of a cycle at the highest Doppler shift, or $\frac{1}{4} \cdot 10$ ms = 2.5 ms. This suggests that one 128-chip period should be shorter than 0.625 ms, corresponding to a chip rate of greater than 200 KB/s. The chip rate in a preferred implementation is 270.8333 KB/s, meeting the above criterion.

In cases where the correlations are changing more rapidly, e.g., when the propagation path is rapidly varying, the future correlation values are better predicted using the trend or time derivative of the correlation. The trend can be advantageously developed by using the measured correlation $Z(i)$ to correct the previous prediction $\underline{Z}(i)$ and its derivative $\underline{Z}'(i)$ according to the following expressions:

$$\underline{Z}_{cor}(i) = \underline{Z}(i) + a(Z(i) - \underline{Z}(i))$$

$$\underline{Z}_{cor}'(i) = \underline{Z}'(i) + b(Z(i) - \underline{Z}(i))$$

where a and b are suitable coefficients. The corrected values $Z_{cor}(i)$ and $Z_{cor}'(i)$ are then used to develop the prediction $\underline{Z}(i+1)$ according to the following expression:

$$\underline{Z}(i+1) = \underline{Z}_{cor}(i) + \underline{Z}_{cor}'(i) \, dT$$

where dT is the time difference between predictions. By suitable choice of the coefficient b, dT can be taken as unity or an inverse power of two, thereby advantageously avoiding a relatively time-consuming multiplication.

The coefficients a and b are found by applying known Kalman filter theory. General aspects of Kalman-type estimators are described in the literature, e.g., H. Van-Landingham, *Introduction to Digital Control Systems*, ch. 8 "Observability and State Estimator Design", Macmillan Publishing Co., New York (1985). The coefficients a, b are derived from the Kalman filter formulation as follows.

Let $$A(i) = \begin{bmatrix} Z(i) \\ Z'(i) \end{bmatrix}$$

be a 2-element complex column vector of the quantity Z that is to be estimated, and its time derivative Z'. The index i refers to current best estimates. The next values of $A(i+1)$, $Z(i+1)$ and $Z'(i+1)$ can be anticipated from the previous estimates before any new information is received by means of:

$$Z(i+1) = Z(i) + Z'(i).dT$$

$$Z'(i+1) = Z'(i)$$

which states that $Z(i)$ is predicted dT forward using the derivative estimate, but the derivative estimate remains the same as we have no second derivative estimate with which to make a better prediction. These equations can be written as follows:

$$A(i+1) = \begin{bmatrix} 1 & dT \\ 0 & 1 \end{bmatrix} \cdot A(i).$$

The matrix $$\begin{bmatrix} 1 & dT \\ 0 & 1 \end{bmatrix}$$

will be designated by the symbol W, which then represents the systematic expected change of A even if no further information were to be received.

According to Kalman filter theory, an inverse covariance matrix P, in this case a 2×2 matrix of complex coefficients, is also predicted from its previous value, the process having been initiated with P large and diagonal. $P(i+1)$ is predicted from $P(i)$ according to the following matrix expression:

$$P(i+1) = W\#P(i)W + Q$$

where # means complex conjugate transpose and Q is a constant matrix, usually diagonal, that determines how fast the process can track changes. Also, the value of the next observation to be made $U(i+1)$ (i.e., the next correlation value to be computed) is predicted assuming it is a function of the next A values from the following expression:

$$U(i+1) = F(A(i+1)).$$

In the case in point, the value to be observed is just $Z(i+1)$ so the function F is simply $$\begin{aligned} U(i+1) &= 1 \cdot Z(i+1) + 0 \cdot Z'(i+1) \\ &= (1,0) \cdot A(i+1) \end{aligned}$$

The vector (1,0) in its column vector form is assigned the symbol X and is the gradient vector of U with respect to the vector A.

The indexing notation using i can be dropped for brevity as it is implicit that new values on the left hand side are calculated using previous values on the right hand side, yielding the following expressions:

$$\begin{aligned} \text{Predict:} \quad P &= W^\# \cdot P \cdot W + Q \\ A &= W \cdot A \\ U &= X^\# \cdot A \end{aligned}$$

The prediction of U is now compared with the next observation (i.e., the next correlation value, that is, the actual $Z(i+1)$), and a prediction error E computed from the following expression:

$$E = U - Z_{actual}.$$

The predictions are now corrected using the following:

$$A = A - P \cdot X \cdot E \quad (1)$$

$$P = P - \frac{P \cdot X \cdot X^\# \cdot P}{[1 + X^\# \cdot P \cdot X]}$$

The foregoing equation (1) may be compared with the equations for updating Z and Z' using coefficients a and b. In fact, these equations in terms of the vector A are as follows:

$$A = A - \begin{bmatrix} a \\ b \end{bmatrix} \cdot E,$$

showing that $$\begin{bmatrix} a \\ b \end{bmatrix}$$

equates to P·X.

The elements of P diminish on each iteration, corresponding to each correlation having a reduced effect on the average prediction as more correlation values are taken into account. The addition of the Q matrix, however, prevents P from going to zero and so determines how large an effect the most recently received values ultimately have, i.e., the rate at which changes will be tracked.

Noting that the sequence of P value calculations does not involve any unknown or noisy received quantities, but only the constant matrices Q and X, the sequence of P values and the value to which P finally converges can be calculated once and for all during design. The final value of P·X gives a 2-element vector that contains the desired coefficients a and b. The calculation of P values may then be dispensed with and the entire calculation reduces to the previously given formulae using the now determined values of a and b. This is known as the "Final Kalman" solution.

Thus, the coefficients are obtained from the final values of the Kalman gain matrix after running the Kalman algorithm long enough for the gain matrix to converge to constant values. These final values may also usually be coarsely quantized, for example to an inverse power of two, to permit easy implementation by shifts or delays and avoid relatively more complicated multiplications.

It is, of course, possible to embody the invention in specific forms other than those described above without departing from the spirit of the invention. The embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for decoding a Code Division Multiple Access signal comprising the steps of:

correlating at least two time shifts of a received signal against a spreading code, the received signal comprising successive transmitted data symbols, the at least two time shifts corresponding to a transmitted data symbol, and the spreading code and a complement of the spreading code corresponding to different respective transmitted data symbols;

weighting the results of the correlating step according to coefficients selected from a coefficient store, each coefficient having a sign and a value that is an inverse integer power of two and corresponding to a respective time shift;

summing the results of the weighting step for each time shift in a respective accumulator; and determining a sign of the sums in the accumulators to decode the transmitted data symbol.

2. The method of claim 1, wherein the correlating step produces numerical binary-coded values in bit-serial form.

3. The method of claim 2, wherein the summing step comprises the step of summing the weighted correlations bit-serially in a plurality of recirculating bit-serial memories.

4. The method of claim 3, wherein the weighting step comprises the step of delaying use of the bit-serial sums by an amount corresponding to the selected coefficients.

5. The method of claim 1, wherein the received signal comprises a plurality of successive complex vector values, the correlating step comprises the step of producing complex correlation values, and the coefficients are complex values.

6. The method of claim 1, wherein the at least two time shifts are correlated against at least two spreading codes, the at least two spreading codes corresponding to different transmitted signals, and the weighting step results are summed for each time shift in a respective accumulator for each spreading code, and the determining step identifies the largest sums produced by the summing means to decode the transmitted data symbols.

7. The method of claim 6, wherein the spreading codes are mutually orthogonal.

8. The method of claim 7, wherein the spreading codes are Walsh-Hadamard codes.

9. The method of claim 8, wherein the correlating step comprises carrying out a Fast Walsh Transform.

10. The method of claim 7, wherein the spreading codes are Walsh-Hadamard codes modified by bitwise modulo-2 addition of a predetermined scrambling bit pattern.

11. The method of claim 10, further comprising the step of varying the scrambling bit pattern from one code block to another in response to a signal from a scrambling sequence generator.

12. An apparatus for decoding a Code Division Multiple Access signal comprising:

means for correlating at least two time shifts of a received signal with a spreading code, the received signal comprising successive transmitted data symbols, the at least two time shifts corresponding to a transmitted data symbol, and the spreading code and a complement of the spreading code corresponding to different respective transmitted data symbols;

means for weighting correlations produced by the correlating means according to respective ones of at least two coefficients, each coefficient having a sign and a value that is an inverse integer power of two and corresponding to a respective time shift;

means for summing the weighted correlations produced by the weighting means for each time shift; and means for determining a sign of the sum produced by the summing means to decode the transmitted data symbol.

13. The apparatus of claim 12, wherein the correlating means produces binary-coded values in bit-serial form.

14. The apparatus of claim 13, wherein the summing means comprises a plurality of bit-serial adders and associated recirculating bit-serial memories.

15. The apparatus of claim 14, wherein the weighting means comprises means for delaying use of a bit-serial value produced by the correlating means by an amount corresponding to the respective coefficient.

16. The apparatus of claim 12, wherein the correlating means correlates the at least two time shifts against at least two spreading codes, the at least two spreading codes corresponding to different transmitted data symbols, and the summing means sums weighted correlations for each time shift for each spreading code, and the determining means identifies the largest sums produced by the summing means to decode the transmitted data symbols.

17. The apparatus of claim 16, wherein the spreading codes are mutually orthogonal.

18. The apparatus of claim 17, wherein the spreading codes are Walsh-Hadamard codes.

19. The apparatus of claim 18, wherein the correlating means comprises means for carrying out a Fast Walsh Transform.

20. The apparatus of claim 19, wherein the spreading codes are Walsh-Hadamard codes modified by bitwise modulo-2 addition of a predetermined scrambling bit pattern.

21. The apparatus of claim 20, further comprising a scrambling sequence generator and means for varying the scrambling bit pattern from one code block to another in response to a signal from the scrambling sequence generator.

22. The apparatus of claim 12, wherein the received signal comprises a plurality of successive complex vector values, the correlating means produces complex correlation values, and the coefficients are complex values.

23. The apparatus of claim 22, further comprising means for determining coefficients from complex correlation values produced by the correlating means, the determined coefficients for use in decoding a succeeding transmitted data symbol.

24. The apparatus of claim 23, wherein the coefficient determining means comprises means for averaging the real and imaginary parts of the complex correlation values and means for quantizing the averaged parts to respective values that are each an inverse integer power of two, the quantized values being for use as coefficients in decoding the succeeding transmitted data symbol.

25. The apparatus of claim 24, wherein the averaging means includes a Kalman filter.

26. An apparatus for decoding a Code Division Multiple Access signal comprising:

means for correlating at least two time shifts of a received signal with at least two spreading codes, the received signal comprising successive transmitted data symbols and the spreading codes corresponding to different transmitted data symbols;

means for weighting correlations produced by the correlating means according to coefficients selected from a coefficient store, the coefficients having values selected from the group comprising $\pm 1, \pm\frac{1}{2}, \pm\frac{1}{4}, \ldots$ and 0, and each coefficient corresponding to a respective time shift and a respective spreading code;

means for summing the weighted correlations produced by the weighting means for the time shifts for each spreading code;

means for determining the largest sum produced by the summing means to decode a transmitted data symbol; and means for subtracting a waveform corresponding to the decoded transmitted data symbol from the received signal.

27. The apparatus of claim 26, wherein the spreading codes are mutually orthogonal.

28. The apparatus of claim 27, wherein the spreading codes are Walsh-Hadamard codes.

29. The apparatus of claim 28, wherein the correlating means comprises a Fast Walsh Transform processor.

30. The apparatus of claim 28, further comprising means for modifying the Walsh-Hadamard codes by bitwise modulo-2 addition of a scrambling bit pattern.

31. The apparatus of claim 30, further comprising a scrambling sequence generator and wherein the scrambling bit pattern varies from one Walsh-Hadamard code block to another in response to a signal from the scrambling sequence generator.

32. The apparatus of claim 26, wherein the subtracting means subtracts the waveform based on the correlations.

33. The apparatus of claim 32, wherein a waveform is subtracted for each time shift and the subtracted waveforms are based on the correlations with the corresponding time shifts.

34. The apparatus of claim 33, wherein the subtracting means subtracts the waveforms for different time shifts in order of the correlation magnitudes from strongest to weakest.

35. The apparatus of claim 34, wherein the correlating means correlates at least two time shifts of the received signal after subtraction of the waveform from a time shift having a stronger correlation.

36. An apparatus for receiving and decoding a Code Division Multiple Access signal comprising successive transmitted data symbols comprising:

means for receiving the signal, wherein the receiving means includes means for generating successive samples of complex vector components of the signal and means for digitizing the samples;

means for storing a plurality of the digitized samples of a transmitted data symbol;

means for determining Fast Walsh Transforms of the stored digitized samples, wherein the determining means correlates at least two time-shifted groups of the stored digitized samples with each of a plurality of orthogonal codes, each orthogonal code corresponding to a respective transmitted data symbol, and generates correlation results, each correlation result having a real part and an imaginary part;

means for determining respective weighting coefficients for the real part and the imaginary part of the correlation result for each code and for each time-shifted group and for applying the weighting coefficients to the real parts and the imaginary parts;

means for summing the weighted parts over all time-shifted groups, the summing means comprising a respective accumulator for each code; and means for determining the accumulator containing the largest sum and thereby decoding the transmitted data symbol, wherein the weighting coefficient determining means determines the weighting coefficients for a succeeding transmitted data symbol from the correlation results and the decoded transmitted data symbol.

37. The apparatus of claim 36, wherein the Fast Walsh Transform determining means re-correlates the time-shifted groups with the orthogonal code corresponding to the decoded transmitted data symbol.

38. The apparatus of claim 37, wherein the Fast Walsh Transform determining means re-correlates the time-shifted groups with the orthogonal code corresponding to the decoded transmitted data symbol in descending order of correlation result magnitude.

39. The apparatus of claim 38, further comprising means for subtracting a set of values representing a waveform corresponding to the orthogonal code corresponding of the decoded transmitted data symbol from a time-shifted group after that group has been re-correlated with the orthogonal code corresponding to the decoded transmitted data symbol.

40. The apparatus of claim 39, wherein the set of values is based on the correlation result.

41. The apparatus of claim 40, wherein the subtracting means includes means for setting to zero the correlation result corresponding to the decoded transmitted data symbol produced by the Fast Walsh Transform determining means and the Fast Walsh Transform determining means includes means for determining an inverse fast Walsh transform of the correlation results and for replacing the stored plurality of digitized samples with new samples corresponding to the inverse fast Walsh transform.

* * * * *